United States Patent [19]
Golshani et al.

[11] Patent Number: 5,797,137
[45] Date of Patent: Aug. 18, 1998

[54] METHOD FOR CONVERTING A DATABASE SCHEMA IN RELATIONAL FORM TO A SCHEMA IN OBJECT-ORIENTED FORM

[76] Inventors: Forouzan Golshani, 5346 E. Royal Palm Rd., Paradise Valley, Ariz. 85253; Oris D. Friesen, 5136 E. LeMarche Ave., Scottsdale, Ariz. 85254-1667; Thomas H. Howell, 8201 E. Del Cadena Dr., Scottsdale, Ariz. 85258

[21] Appl. No.: 624,722

[22] Filed: Mar. 26, 1996

[51] Int. Cl.⁶ .................................................. G06F 17/30
[52] U.S. Cl. ........................... 707/4; 707/2; 707/103
[58] Field of Search .................... 395/612, 700, 395/614, 601; 707/2, 4, 103, 100; 701/1

[56] References Cited

U.S. PATENT DOCUMENTS

| | | | |
|---|---|---|---|
| 5,317,742 | 5/1994 | Bapat | 395/700 |
| 5,481,703 | 1/1996 | Kato | 395/611 |
| 5,499,371 | 3/1996 | Henninger et al. | 395/700 |
| 5,504,885 | 4/1996 | Alashqur | 395/612 |
| 5,548,749 | 8/1996 | Kroenke et al. | 395/612 |
| 5,596,746 | 1/1997 | Shen et al. | 395/612 |
| 5,659,723 | 8/1997 | Dimitrios et al. | 707/103 |

Primary Examiner—Thomas G. Black
Assistant Examiner—Frantz Coby
Attorney, Agent, or Firm—J. S. Solakian; E. W. Hughes

[57] ABSTRACT

A method executed by a computer system for converting a database schema in relational form to a schema in object-oriented (OO) form. The input is the schema of a database in relational form including all relations of the schema and the primary keys, reference keys, and attributes of each relation. A special data structure (SDS) is created for each primary key based on the number of attributes of the key. Each SDS becomes the basis of an object of the OO schema produced. Attribute functions and cross-reference functions are created based on the SDSs and reference keys. SQL commands to map the relational input schema to the OO output schema are identified.

3 Claims, 5 Drawing Sheets

METHOD FOR CONVERTING A DATABASE SCHEMA IN RELATIONAL FORM TO A SCHEMA IN OBJECT-ORIENTED FORM

CROSS-REFERENCE TO RELATED APPLICATIONS

U.S. Patent Application of Forouzan Golshani, et al entitled Method of Integrating Schemas of Distributed Heterogeneous Databases filed concurrently herewith which application is assigned to the assignee of the present invention.

BACKGROUND OF THE INVENTION (1) Field of the Invention

This invention relates to distributed database management systems and more particularly to a method of converting a schema of a database in relational form to an equivalent schema in object-oriented (OO) form.

(2) Description of the Related Art

Many enterprises have accumulated throughout the years a number of database management systems (DBMS)s. These systems are generally heterogeneous in that they differ from one another in many respects including form, data model, language for implementation, languages for querying and updating, and data types, and thus the schemas for each are in different forms. With the trend toward interoperability in enterprises, it has become more and more necessary for the existing database management systems to cooperate and to exchange data. Without a software tool, or method, for schema integration, a user must either manually retrieve the local schemas of other database systems of interest or guess what may be available on other desired database systems which reside at a remote site. Without a global (integrated) schema, any query involving retrieval from more than one database system must be broken down manually, and partial answers received from the participating database systems must be merged by a set of commands issued by the user. For a description of a method for schema integration, reference is made to the above identified cross-referenced patent application which is incorporated herein by reference and made a part hereof.

Schema Integration is the integration of a plurality of existing schemas into a single logical schema. However, to do so it is necessary to convert the schemas of each database management system to be integrated into a form that facilitates such integration.

While a method of converting a schema of a data base in relational form to an object-oriented form is particularly useful in the process of integrating schemas of distributed heterogeneous databases, this method also has utility in database normalization wherein a schema is converted to an OO form and then back to a relational form again; the resulting relational schema will be in "Third Normal Form", a form that has many desirable characteristics. Another application of this method is in database reorganization for the purpose of migration. The object-oriented form provides an intermediary form as a midway step in database migration. Another potential application of this method is in data mining, where hidden characteristics of data are discovered through a deductive process.

SUMMARY OF THE INVENTION

The present invention is a software tool, or method, by which a computer system converts a database schema in relational form to an equivalent database schema in object-oriented form.

BRIEF DESCRIPTION OF THE DRAWINGS

Other objects, features and advantages of the invention will be readily apparent from the following description of a preferred embodiment thereof although variations and modifications may be affected without departing from the spirit and scope of the novel concepts of the disclosure, and in which.

DESCRIPTION OF THE PREFERRED EMBODIMENTS

Figure 1:
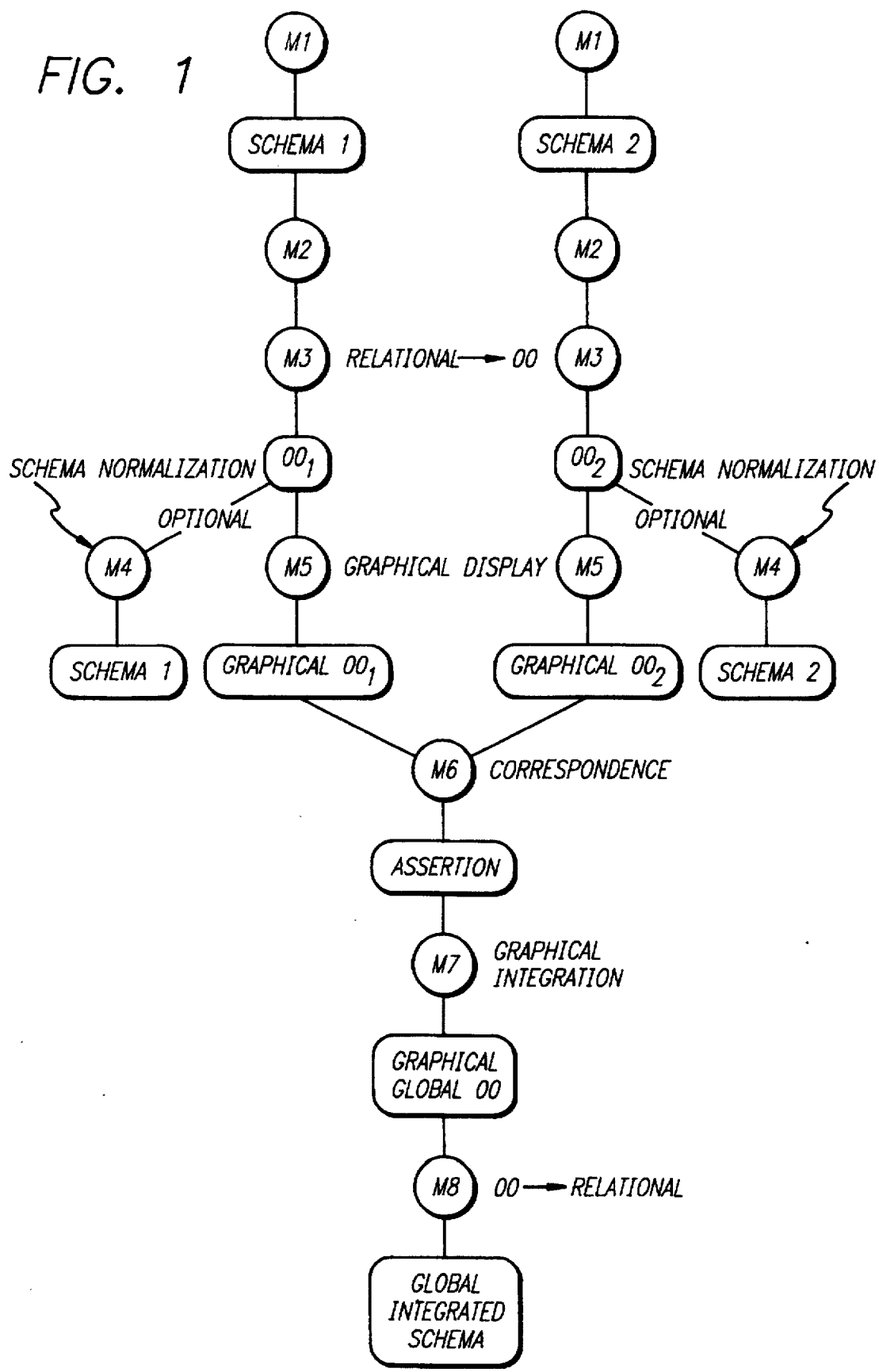
FIG. 1 is a data flow diagram of the components and software modules of the schema integration tool.

FIGS. 1a and 1b, illustrate the flow of information among the modules of the cross-referenced patent application for a method of integrating schemas. The function of software module M3 of the method illustrated in FIGS. 1a and 1b is to convert a database schema in relational form to a schema in object-oriented form, the subject matter of the present application.

Figure 2:
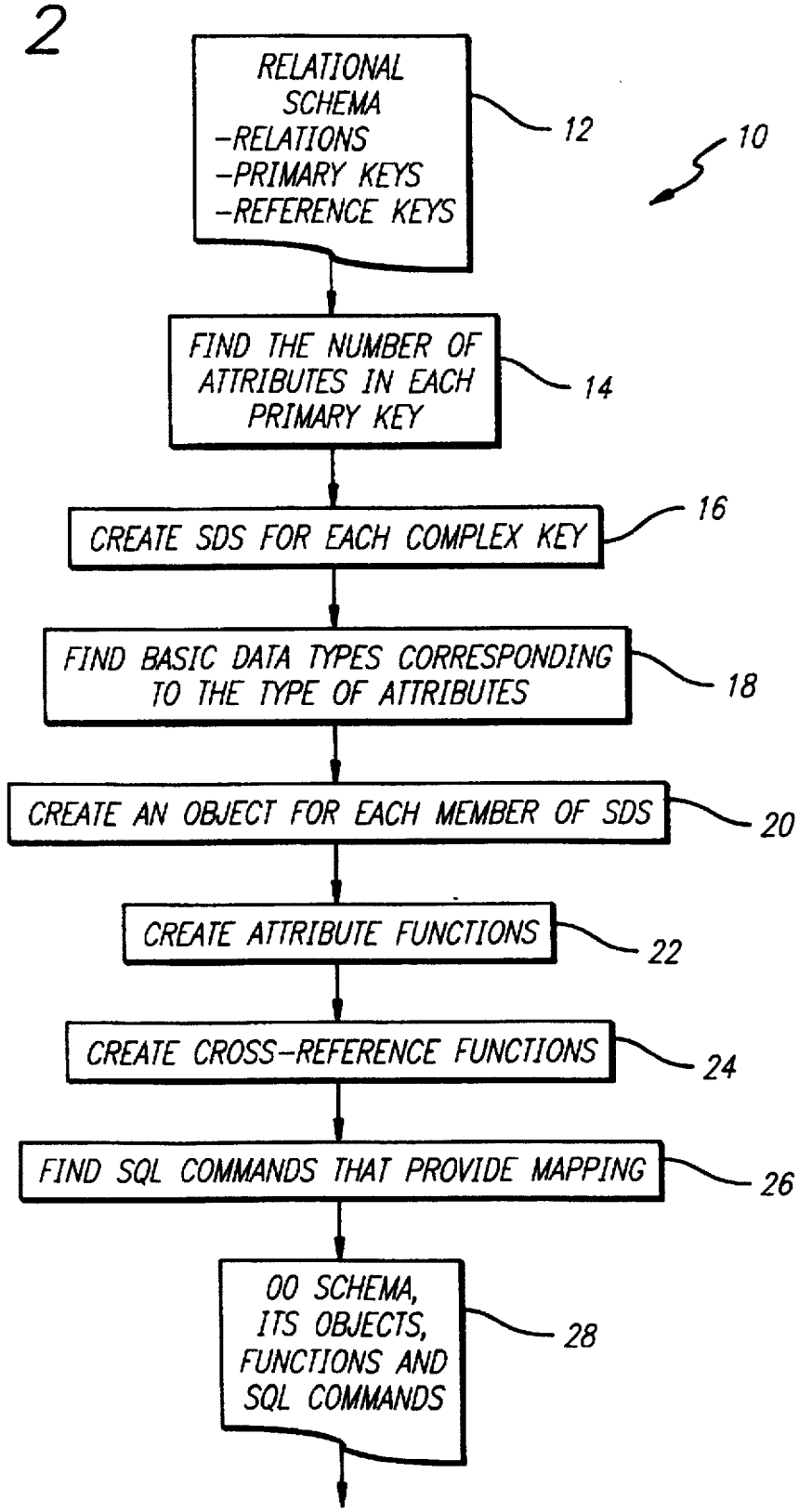
FIG. 2 is a flow chart of the steps of the process for converting a database schema in relational form to one in object-oriented form.
Figure 3A:
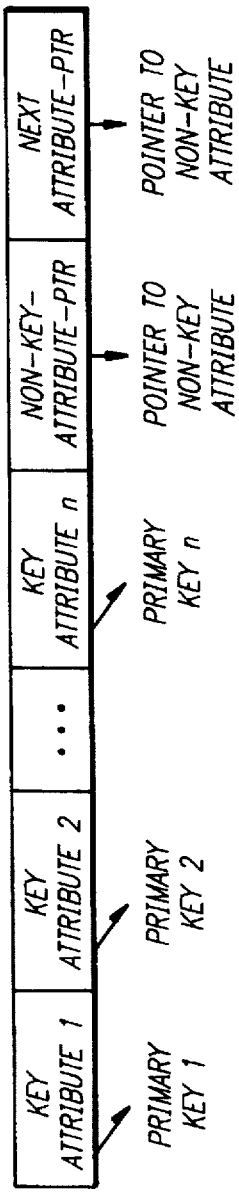
FIG. 3 is an example of a data structure.
Figure 3B:
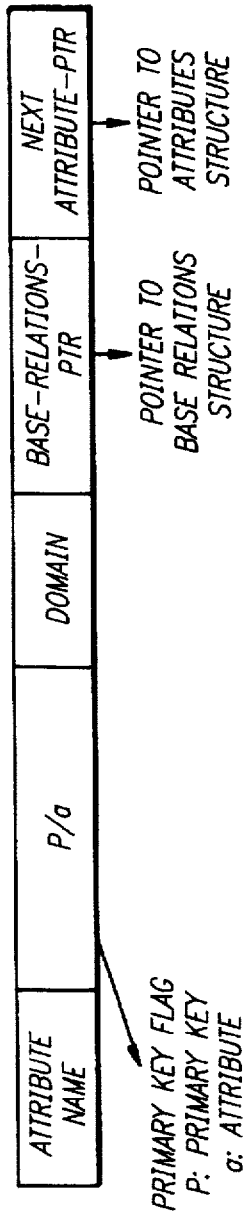
Figure 3C:
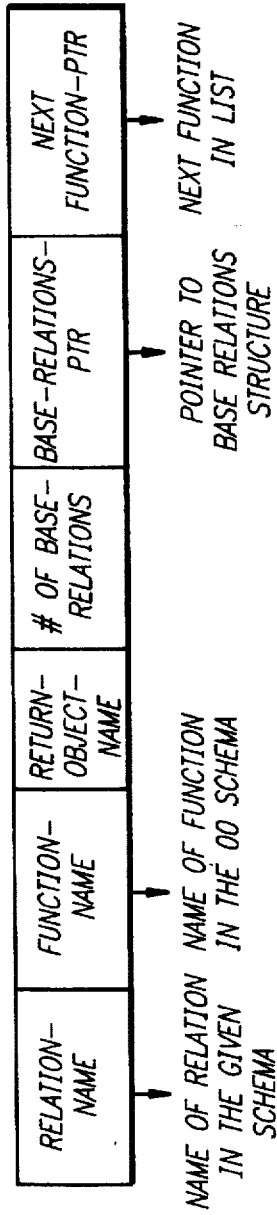
Figure 3D:
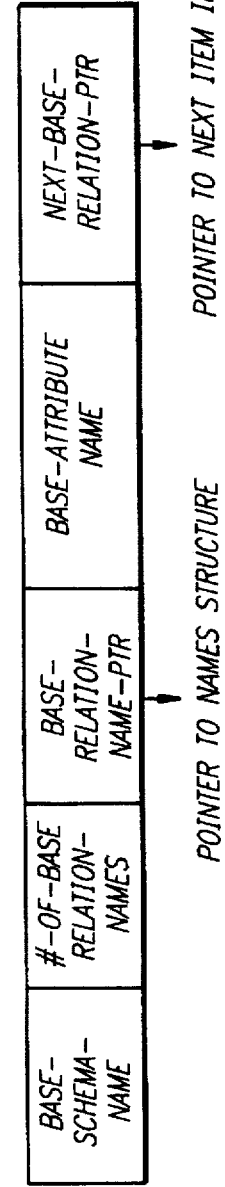

In FIG. 2, the steps of the method, or algorithm, 10 are illustrated. The input, block 12 is a schema of a relational data base system, preferably in "Third Normal Form", including all relations, all attributes, primary keys, and references that are made by attributes of one relation to the keys of other relations. The first step of program 10, block 14, lists the primary keys of all of the relations of the schema and finds the maximum length of the primary keys; where the length of a primary key is determined by the number of attributes of that primary key. In step 2, block 16, a special data structure (SDS) is created for each primary key based on the number of attributes comprising the primary key, as illustrated in FIG. 3 Each SDS becomes a domain of a function in the object oriented (OO) schema produced by method 10.

In the third step, block 18, the basic data types that correspond to each attribute, such as string, integer, etc. are defined. In the fourth step, block 20 an object in the OO schema is created for each member of the SDS. In step 5, block 22, functions that represent attributes of objects, are created as follows:

if the primary key is not complex (i.e. has only one attribute), the function created will be a simple function and will have only one argument.

if the primary key is complex (i.e., has n attributes, or has a length of n), the function created will have n arguments.

In step 6, block 24, cross-reference functions are created based on the special data structure and reference keys.

Figure 6:
FIG. 6 is a textual representation of a schema.

Appropriate SQL commands are identified, block 26, to provide a mapping from the relational schema input, block 12, to the OO schema output, block 28. The output OO schema 28 includes the data structure that method 10 generates, and thus, a history of the evolution of the output schema. The output schema 28 has a textual form as is illustrated in FIG. 6.

Figure 4:
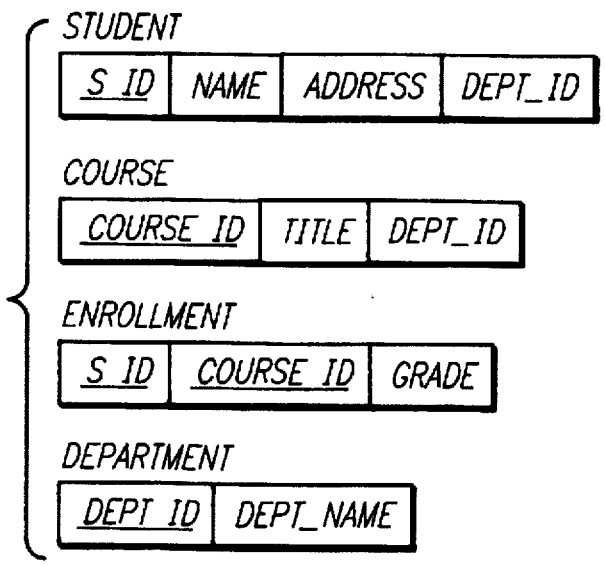
FIG. 4 is an example of a partial schema of a database of a "University" in relational form.
Figure 5:
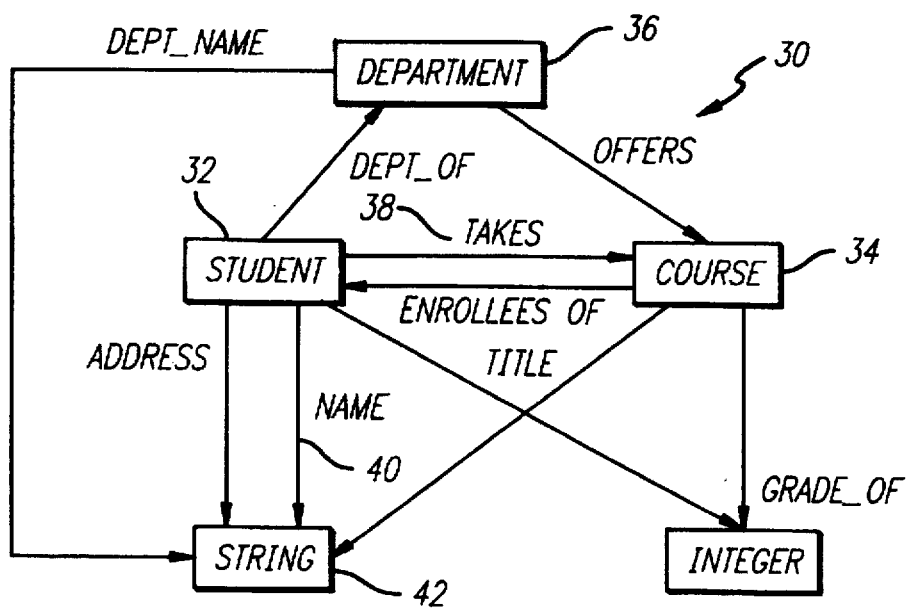
FIG. 5 is an equivalent schema in object-oriented form.

The method, or algorithm, of this invention converts a database schema in relational form to an equivalent schema in an object-oriented form. The object-oriented form is based on the functional data model in which objects are presented as sets and the attributes of each object are presented as functions mapping these sets to each other. For example in FIG. 4, a simplified schema of a university is presented in relational form, where primary keys are identified by underlining. The equivalent schema for the above database in object-oriented form is presented in FIG. 5. The rectangles in this figure represent objects, namely, "STUDENT" 32, "COURSE" 34, "DEPARTMENT" 36, and "STRING" 42. The arrows represent the relationships between objects and the attributes of the objects. For example, the arrow 38 labeled "takes" represents which "STUDENT" has registered for what "COURSE". On the other hand, the arrow 40 labeled "name" represents the name of each "STUDENT". The object "STRING" 42 is a string of alphanumeric characters such as a student's name, the title of a course, etc.

What is claimed is:

1. A method residing in a computer system for converting a database schema in relational form including at least one relation, with each relation having attributes, one or more of said attributes functioning as a primary key of a given relation, and other attributes of the relation functioning as reference keys as needed, to an equivalent object-oriented schema in functional data model form; comprising the steps of:

a) receiving as an input the database schema in relational form including a list of the relations of the data base schema, and the attributes of each relation including its primary key and reference keys if any of said input database schema;

b) determining the maximum number of attributes comprising the primary key of each relation of the input schema;

c) creating a special data structure (SDS) for each primary key of each relation of the input schema based on the number of attributes of the primary key of each relation of the input schema, each SDS constituting an object in the equivalent schema;

d) converting each SDS to a complex object of the equivalent object-oriented schema;

e) identifying data types of each complex object of the equivalent schema;

f) producing for each complex object a set of functions that represent attributes of the complex object;

g) producing cross reference functions based on the SDS's produced in step c) for each relation and the reference keys thereof;

h) selecting appropriate SQL commands to provide a mapping between the input database schema in relational form to an equivalent object-oriented schema in functional data model form; and i) producing as an output the equivalent object-oriented schema in functional data model form including names of objects and functions, and SQL commands.

2. The method of claim 1 in which the input database schema is in the "Third Normal Form".

3. The method of claim 2 in which the data types of each complex object of the equivalent schema include a string of alphanumeric characters and numbers.

* * * * *